J. COCHRANE.
MACHINE FOR MAKING SCREWS.
No. 63,364. Patented Apr. 2, 1867.
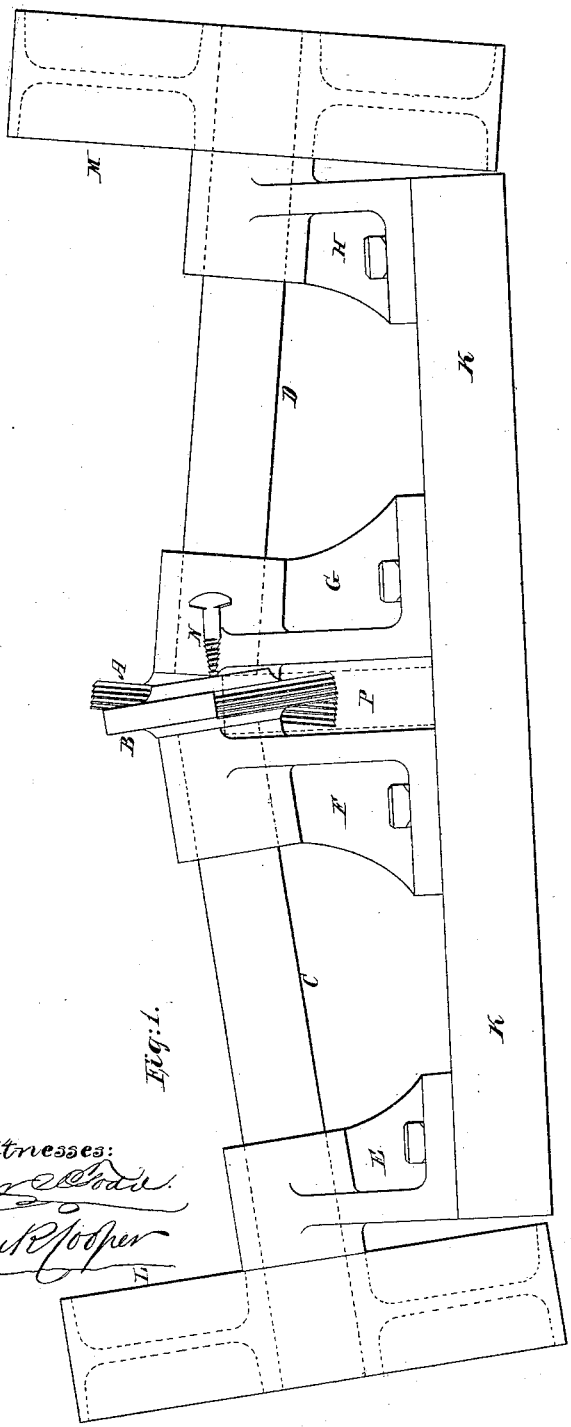
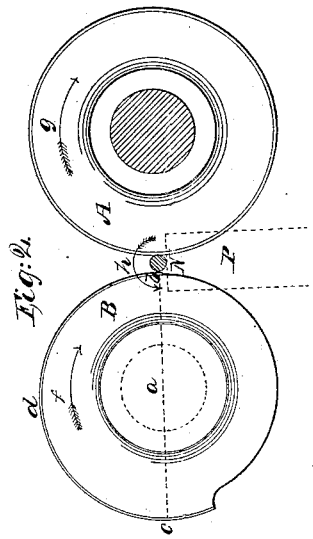

United States Patent Office.

JOHN COCHRANE, OF WALL TOWNSHIP, NEW JERSEY.

Letters Patent No. 63,364, dated April 2, 1867; antedated March 24, 1867.

IMPROVEMENT IN MACHINES FOR MAKING SCREWS.

*The Schedule referred to in these Letters Patent and making part of the same.*

TO ALL WHOM IT MAY CONCERN:

Be it known that I, JOHN COCHRANE, of the township of Wall, county of Monmouth, and State of New Jersey, have invented a new and useful Machine for Forging or Spinning Screws upon Metal Bolts; and I do hereby declare that the following is a full and exact description thereof, reference being had to the accompanying drawings, and to the figures and letters marked thereon, and in which—

Figure 1 is a side elevation of the machine; and

Figure 2 a front elevation of the operative parts thereof.

The nature of my invention consists in forming screws upon metal bolts by means of cross-rolling; the rolls or revolving dies having upon their peripheries a few projections or threads, corresponding in reverse to the shape and pitch of the required screw, and made to rake or coincide with the angle of such screw upon the bolt by giving the necessary inclination to the axes of the rolls for that purpose.

To enable others skilled in the art to make and use my invention, I will proceed to describe its construction and mode of operation; and for this purpose I will refer to a machine designed for the special service of forming screw-threads upon screw-spikes or wood-screw bolts, to be used in the fastenings for securing railroad rails to the cross-ties, one of the objects of this invention being to cheapen the cost of such fastenings.

These screw-spikes or wood-screw bolts, it is intended, shall be made from five-eighth or three-quarter inch round-bar iron, the screwed part to be made tapering, or of equal diameter for a portion of its length, and terminating in a conical or gimlet point. The thread of this screw should be of serrated form, so as to enter freely and hold efficiently in timber; and for the sizes stated, should be about a quarter of an inch in pitch and about an eighth of an inch in depth. For the production of such screws I use a pair of rolls or revolving dies of about twelve inches diameter, of wrought iron, faced upon the periphery with steel, and properly tempered. One-half the periphery of such a roll is about equal to the length of the helix or thread of such screw, as measured on the line of mean surface.

One of these rolls, A, I make cylindrical, and form upon its surface a series of threads or projections, corresponding in reverse to the shape of the threads and spaces of the required screw. The other roll, B, I make about the same size, but one-half or so of its periphery is made eccentric and with about a half inch of throw; the minor radius, $a\ b$, of this eccentric part being a quarter of an inch less than the radius of the roll A, and the major radius, $a\ c$, a quarter of an inch more than the radius of the roll A, so as to conform to the taper of the bolt. The eccentric portion of this roll is threaded like the roll A, but the remaining portion of the periphery is without threads. If the screwed portion of the bolt is to be of cylindrical form, terminating in a conical or gimlet point, the threaded portion of the periphery of the roll B must be shaped to suit these conditions; and if screws of cylindrical form only are required, the eccentricity of the periphery is dispensed with, and such threaded portion made to the same radius as the roll A; but in all cases the denuded portion of the roll B must be of such reduced radius as will afford the necessary space in which to insert the blank bolt, while the machine is in motion, without its being acted upon by the other roll; and if the machine has an intermitted motion, affording the necessary pause for the insertion of the blank, the denuded portion of the periphery need not be more than about one inch, which would be sufficient for the purpose, and thus afford a greater portion of the periphery to be used as a die. The rolls or revolving dies are attached to substantial spindles C and D, which are securely mounted in proper bearings upon the pedestals E, F, G, and H, cast upon or attached to the bed-piece K K, all of which parts should be heavy and well fitted, so as to prevent yielding or springing while in use. The spindles C and D are also inclined in opposite directions, as shown in fig. 1, so as to cause the screw-threads upon the peripheries of the rolls to rake with the angle of the required screw upon their respective sides of the bolt. Instead of making the threads upon the periphery of the rolls of screw-form, or helical, I prefer to make them in the form of separate parallel members or annular projections, and to adjust them to the angle of the required screw upon the bolt by inclining the axes of the spindles, as above stated, which is an important improvement not only in the operation of the machine, but also as effecting a very great saving in its original cost and in subsequent repairs. In setting the rolls great accuracy must be observed in their adjustment so as to have the members or threads upon their peripheries to co-aptate exactly with the threads of the screw upon the bolt. Upon the outer ends of the spindles C and D, I attach the pulleys L and M, about twenty-four inches, more or less, in diameter, and of sufficient face for belts of five or six inches in width; which driving-belts pass over a pair of similar pulleys upon a counter-shaft laid parallel to a vertical plane passing through the axis of either of the spindles C and D, and in the same horizontal level with the centres of the pulleys L and M, so as to drive both rolls, A and B, with the same speed and with the same direction of motion; and which, for right-hand screws, must be as indicated by the arrows $f$ and $g$, fig. 2; and for the purpose of steadying the motion, it would be advantageous to attach to each of the roll spindles a fly-wheel of suitable size and weight. But if the rolls are driven by gearing the fly-wheel may be attached to the pinion-shaft. It must be observed that in thus driving the rolls by belts, the threads upon the peripheries must be of annular construction and have their axes inclined so as to make such annular threads conform to the angle of the screw-threads upon the bolt. The blank or bolt upon which the screw is to be formed, being previously heated, as in the ordinary operations of forging, is placed between the two rolls A and B, as shown at N, fig. 2, and run in to the full distance upon which the screw is to be formed upon it, the head being to the front. There is also a support, as shown by dotted lines at P, in both figures, upon which the heated bolt is deposited when introduced to the machine, and upon which it rests till the enlarged or threaded portion of the periphery of the roll B comes in contact with it, when it will be pressed over against the periphery of the roll A. The threads on the peripheries of both rolls will then penetrate the blank bolt on its opposite sides, and thereby commence the formation of a screw upon it; and the roll A, acting across the surface of the bolt from below upwards, and the roll B in like manner acting across its surface from above downwards, and the members or threads upon the peripheries of both rolls penetrating the blank to their full depth, and, as it were, gearing into its surface on its opposite sides, it is thereby caused to revolve between them upon its own axis with the direction of motion indicated by the arrow $h$, fig. 2, making the indentations caused by the penetration of the members or threads of the rolls continuous upon the surface of the bolt, and thus forming an elevated helix or screw-thread upon the bolt between the said indentations; and the bolt being rotated from right to left by the action of the rolls, it will work itself outwards to the front, by the screw thus formed upon it acting in the members or threads of the rolls as in the threads of a nut, as the operation progresses, till the screw is completely finished from the neck to the point, when it is thrown out in front from between the rolls, as shown at N, fig. 1; the threaded portion, $b\ d\ c$, of the roll B, being so proportioned and shaped as to suit the length and form of the required screw, as before explained. When the point $c$ of the roll B has passed the point of action with the roll A, the denuded portion of the periphery of the roll B affords the necessary space in which to place the blank bolt between the rolls, and for this purpose a period of time equal to what is required for about half a revolution of the rolls is given. The speed of the rolls should therefore be regulated to suit the dexterity of the attendant in placing the blank bolts between the rolls at the proper moment, so that at each revolution of the rolls a bolt may be placed between them, have a screw formed upon it, and be delivered from the machine completely finished. The machine being thus constructed and operated, a careful attendant could feed in from thirty to sixty blanks per minute, as the heated blanks could be deposited, when taken from the heating furnace, in proper order near to the support P, so that they could, with very little effort, be set or pushed into the space between the rolls at each revolution. It would therefore be quite possible for such a machine to make and deliver from twelve thousand to twenty-five thousand or more screws per day. The bolts passing through this machine being highly heated it will be necessary to cool all the parts with which they come in contact, so as to preserve the machine from the injurious effects of such heat, which may be done by means of water, as is usual in such cases. The rolls A and B, instead of being driven by belts, as above described, may be driven by cog-wheel gearing if preferred, and in that case both rolls may be made with a threaded and a plain part, as in the roll B, as the gearing will insure the return to each other of such threaded and denuded parts in every revolution of the rolls, whilst the possibility of the belts slipping on the pulleys requires that one of the rolls, when thus operated, should be a complete cylinder, so as to be always ready to oppose the threaded portion of the other roll. But instead of making either or both the rolls with threaded and denuded parts in their peripheries, as described, both of them may be cylindrical and have complete threads upon their peripheries like the roll A, by causing either or both of said rolls to move laterally to and from the other at proper intervals, by means of cams or other suitable mechanism, as well known and understood by the constructors of such machinery, so as to open the rolls wide enough apart to receive the blank between them without being acted on by them, and then to close them upon it so as to form a screw thereon by the penetration into such blank of the members or threads that are on the peripheries of the rolls. In this mode of construction the diameter of the rolls is not controlled by the length of the helix to be formed upon the bolt; they may therefore be of any convenient diameter; and by giving such form to the cam or such movement to the laterally operating mechanism as may be required, screws of uniform diameter, or tapering or gimlet pointed, may be produced; and various other modifications or arrangements of the mechanism might possibly be suggested or made without thereby changing the nature of the invention. I do not therefore limit myself to any specific arrangement or proportion of the parts or mode of operating the same, but claim the right to construct and operate the machine in the manner best calculated to answer the purpose for which it is intended, so long as the principles by which the invention is characterized are employed.

Having thus fully described the nature, construction, and mode of operation of mechanism for making screws upon heated metal bolts by means of cross-rolling, and shown some of the variations in construction and operation of which such cross-rolling mechanism is susceptible, what I claim therein as my own invention, and desire to secure by Letters Patent, is—

1. The combination with each other of two rolls or revolving dies, having projecting threads of proper form and arrangement upon their peripheries to produce the required screw upon the heated blanks, and working at the proper angle for the production of such screws, and having a denuded portion of reduced radius in the periphery of either or both said rolls or revolving dies, so as to permit the introduction of the blank bolts between them at the proper moment in each revolution, substantially as herein described.

2. The combination with each other of two revolving rolls or dies, having the threaded portion of the periphery of either or both of them so formed or shaped as to produce at each revolution a screw of uniform diameter, or tapering or gimlet pointed, as may be required, constructed and operating substantially as herein described.

3. The combination with each other of two rolls or revolving dies, having annular threads or portions thereof upon their peripheries of suitable form for making screws upon blanks, and mounted upon axles or spindles that are so inclined to the axis of the bolt upon which the screw is to be formed as to make such annular threads conform to the angle of such required screw, whether such rolls are mounted on stationary bearings or upon bearings that are so constructed and operated as to give a lateral movement to the rolls or revolving dies to and from each other during the progress of the work, as required in receiving the blank and in making a screw thereon, or for imparting to the screw a uniform diameter, or a tapering or gimlet-pointed form, substantially as herein described.

JOHN COCHRANE.

Witnesses:
 Andrew J. Todd,
 John R. Cooper.